(12) United States Patent
Holman et al.

(10) Patent No.: US 8,911,102 B2
(45) Date of Patent: Dec. 16, 2014

(54) LOW-PROFILE LIGHTING SYSTEM (75) Inventors: Robert L. Holman, San Jose, CA (US); Matthew B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 188 days.

(21) Appl. No.: 13/538,842

(22) Filed: Jun. 29, 2012

(65) Prior Publication Data

US 2014/0003040 A1 Jan. 2, 2014

(51) Int. Cl.
| | |
|---|---|
| F21V 11/08 | (2006.01) |
| F21V 13/10 | (2006.01) |
| F21V 17/00 | (2006.01) |
| F21S 8/04 | (2006.01) |
| F21S 8/00 | (2006.01) |
| F21V 5/04 | (2006.01) |
| F21V 13/02 | (2006.01) |
| F21K 99/00 | (2010.01) |

(52) U.S. Cl.
CPC ........................................ *F21K 9/52* (2013.01)
USPC ........... 362/147; 362/360; 362/338; 362/341; 362/356; 362/551

(58) Field of Classification Search
CPC .................................. F21K 9/52; F21S 8/026
See application file for complete search history.

(56) References Cited

U.S. PATENT DOCUMENTS

| | | | |
|---|---|---|---|
| 6,040,937 A | 3/2000 | Miles | |
| 6,674,562 B1 | 1/2004 | Miles et al. | |
| 7,123,216 B1 | 10/2006 | Miles | |
| 7,327,510 B2 | 2/2008 | Cummings et al. | |
| 7,377,679 B2 | 5/2008 | Schultz | |
| 7,670,032 B2 | 3/2010 | Lau | |
| 7,819,538 B2 | 10/2010 | Nobayashi et al. | |
| 8,096,670 B2 | 1/2012 | Trott et al. | |
| 2009/0129072 A1* | 5/2009 | Oza | 362/231 |
| 2010/0315833 A1 | 12/2010 | Holman et al. | |
| 2010/0321952 A1 | 12/2010 | Coleman et al. | |

FOREIGN PATENT DOCUMENTS

| | | |
|---|---|---|
| DE | 102007024014 A1 | 11/2008 |
| JP | 2007035426 A | 2/2007 |
| WO | WO-2009064607 A1 | 5/2009 |
| WO | WO-2009099547 A2 | 8/2009 |
| WO | WO 2009099547 A2 * | 8/2009 ............... G02B 6/00 |

OTHER PUBLICATIONS

International Search Report and Written Opinion—PCT/US2013/047881—ISA/EPO—Oct. 7, 2013.

* cited by examiner

*Primary Examiner* — Elmito Breval
(74) *Attorney, Agent, or Firm* — Knobbe, Martens, Olson & Bear LLP (57) ABSTRACT

This disclosure provides systems, methods and apparatus for providing a desired illumination pattern within a given plane. In one aspect, a light wash system can be configured to provide substantially even illumination on a wall or floor. The light wash system can use light-shaping optics such as a stack of optical films to provide a light wash system which is smaller than conventional light wash systems which utilize parabolic reflectors. The light wash system may include an internal retroreflector to allow a wider range of throw distances for the light wash system.

29 Claims, 6 Drawing Sheets

LOW-PROFILE LIGHTING SYSTEM

TECHNICAL FIELD

This disclosure relates to lighting systems, particularly for low-profile light wash systems.

DESCRIPTION OF THE RELATED TECHNOLOGY

Lighting systems, such as wall wash systems, can be used to provide a substantially uniform illumination pattern over a section of wall or ceiling to be illuminated. Such lighting systems can be used, for example, in art galleries or similar locations, where even illumination of a particular area is needed without illuminating an entire room or portion of a room. Conventional wall wash systems utilize parabolic reflectors in order to achieve a substantially uniform light wash over a section of wall to be illuminated. The use of such parabolic reflectors significantly increases the size of the wall wash system, and places significant constraints on the use of the wall wash system.

SUMMARY

The systems, methods and devices of the disclosure each have several innovative aspects, no single one of which is solely responsible for the desirable attributes disclosed herein.

One innovative aspect of the subject matter described in this disclosure can be implemented in light fixture component, including a housing, the housing including an input aperture configured to receive collimated light exiting at an oblique angle from a light guide, and an output aperture oriented at an angle to the input aperture and configured to allow light to exit the housing, and a stack of optical films disposed within the output aperture, where the stack of optical films are configured to operate on light exiting the housing through the output aperture to cast a desired light pattern in a plane at a given distance from the output aperture.

In one aspect, the light pattern cast by the stack of optical films can be centered along an axis that is angled 65 degrees or less from a plane of the input aperture. In one aspect, the stack of optical films can be configured to cast a substantially even wash of light within a plane at a given distance from the output aperture, where the plane is substantially orthogonal to a plane of the input aperture. In one aspect, the stack of optical films can include at least a first lenticular film. In a further aspect, the stack of optical films can include at least one of a second lenticular film and a diffuser. In one aspect, the stack of optical films can include an asymmetrical lenticular film. In one aspect, the stack of optical films can consist of a single optical film.

In one aspect, can additionally include a retroreflector disposed within the housing, where the retroreflector is configured to redirect light entering the input aperture towards the output aperture. In a further aspect, the retroreflector can be configured to reflect collimated light entering the input aperture at a first angle relative to a plane of the input aperture and reflect it at a second angle relative to the plane of the input aperture, where the second angle is larger than the first angle. In a further aspect, the retroreflector can be substantially more reflective than other interior surfaces of the housing. In a further aspect, the retroreflector can include a first reflective portion which is inwardly angled relative to a second reflective portion. In a still further aspect, the first reflective portion can be inwardly angled relative to a second reflective portion in a first plane, and the light fixture component can additionally include a third reflective portion which is inwardly angled relative to a second reflective portion in a second plane oriented at an angle to the first plane. In a further aspect, the retroreflector can include an inwardly curving reflective portion.

In one aspect, the housing can be configured to transmit collimated light along substantially parallel paths within the housing. In one aspect, the housing can additionally include a bezel extending outwardly from the housing in a plane substantially parallel to a plane of the input aperture. In one aspect, the light fixture additionally includes a light guide disposed adjacent the input aperture, where the light guide includes an output surface and is configured to direct collimated light through the input aperture at an oblique angle to the output surface of the light guide. In a further aspect, the output surface of the light guide can be oriented substantially parallel to a plane of the input aperture of the housing.

In one aspect, the light fixture component can additionally include an anchor component, where anchor component is configured to be secured relative to an aperture formed in a ceiling or wall, and the housing is configured to be secured to the anchor component on the opposite side of the ceiling or wall from the anchor component. In a further aspect, the anchor component can support at least one light guide in optical communication with a light source, where the light guide can be configured to collimate light emitted from the light source and direct the collimated light into input aperture at an oblique angle to the plane of the input aperture.

Another innovative aspect of the subject matter described in this disclosure can be implemented in a method of assembling a light fixture, the method including providing a housing having an input aperture and an output aperture oriented at an angle to the input aperture, providing a stack of optical films disposed within the output aperture, and positioning the housing relative to a light guide configured to emit light at an oblique angle to the input aperture, such that the light enters the housing through the input aperture and passes through the stack of optical films, where the stack of optical films are configured to operate on light exiting the housing through the output aperture to cast a desired light pattern in a plane at a given distance from the output aperture.

In one aspect, the method can additionally include securing the housing relative to an anchor component disposed adjacent an aperture in a ceiling or wall so as to secure the housing and anchor component relative to the aperture, where at least a portion of the anchor component is disposed on the opposite side of the ceiling or wall from at least a portion of the housing. In one aspect, the light pattern cast by the stack of optical films can be centered along an axis that is angled 65 degrees or less from the plane of the input aperture. In one aspect, the housing can additionally include a retroreflector disposed within the housing and in the path of the collimated light emitting from the light guide, and where the retroreflector is configured to redirect the collimated light entering through the input aperture towards the stack of optical films disposed within the output aperture.

Another innovative aspect of the subject matter described in this disclosure can be implemented in light fixture, including a housing, the housing including an input aperture configured to receive collimated light exiting at an oblique angle from a light guide, and an output aperture oriented at an angle to the input aperture and configured to allow light to exit the housing, and means for altering light passing through the output aperture to cast a desired light pattern in a plane at a given distance from the output aperture.

In one aspect, the light-shaping means can include a stack of optical films disposed within the output aperture. In one aspect, the light-shaping means can be configured to shape and/or direct light passing through the output aperture. In one aspect, the light-shaping means can include at least one of a diffuser and a lenticular film.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

The following detailed description is directed to certain implementations for the purposes of describing the innovative aspects. However, the teachings herein can be applied in a multitude of different ways. While the teachings are applicable to light wash systems for use with thin LED-based light engines, and in particular LED-based light engines which include a light guide for directing the output of an LED-light source in a desired pattern, the teachings may also be applicable to any light wash system configured to operate on light emitted in a substantially collimated pattern. It is contemplated that the described implementations may be included in or associated with lighting used for a wide variety of applications such as, but not limited to: commercial, industrial, and residential lighting. Implementations may include but are not limited to lighting in homes, offices, manufacturing facilities, retail locations, hospitals and clinics, convention centers, cultural institutions, libraries, schools, government buildings, warehouses, military installations, research facilities, gymnasiums, sports arenas, or lighting in other types environments or applications. In various implementations the lighting may be overhead lighting and may project a spotlight or other light wash pattern having an area that is larger (for example, several times or many times larger) than an area of a light emitting surface of a lighting device. Thus, the teachings are not intended to be limited to the implementations depicted solely in the Figures, but instead have wide applicability as will be readily apparent to a person having ordinary skill in the art.

In some implementations, a lighting device or apparatus can include a light engine component and a connection portion for electrically and/or mechanically coupling the lighting device to a light fixture. As used herein, the term "light fixture" refers to any fixture or structure configured to be electrically and/or mechanically coupled to any portion of a lighting device, for example, a recessed light housing, a downlight fixture, a can fixture, a pot light fixture, a cove light fixture, a torch lamp fixture, a pendant light fixture, a sconce fixture, a track light fixture, and/or a bay light fixture.

Conventional wall wash systems operate on light emitted from a substantially linear light source, such as a fluorescent tube. Because the light may be emitted substantially evenly in all directions, the bulky reflectors may be used to redirect light which was originally emitted from the light source in a direction away from the desired illumination area. These large reflectors, such as parabolic reflectors, are necessarily disposed on the opposite side of the light source from the illumination area, and extend upwards into the ceiling. By utilizing a light engine which collimates output light to within a smaller range of angles, compact light redirectors and shaping optics can be used to create a desired light wash pattern.

Figure 1A:
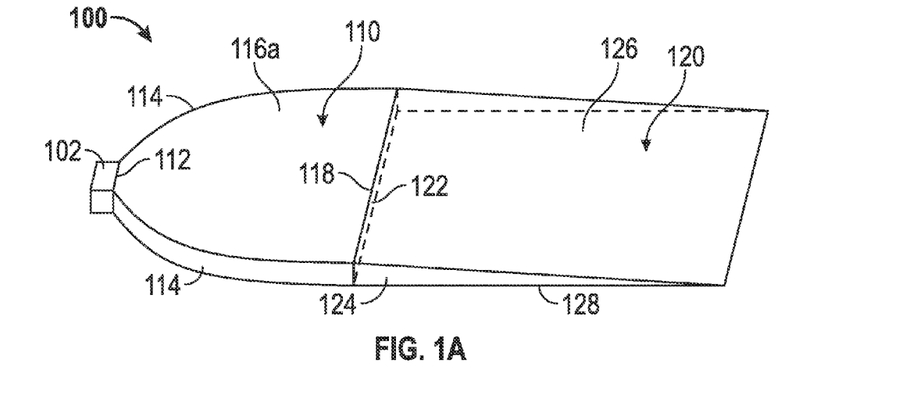
FIG. 1A shows a perspective view of an example of a light engine configured to emit collimated light at an oblique angle.

Particular implementations of the subject matter described in this disclosure can be implemented to realize one or more of the following potential advantages. By utilizing a thin light guide which redirects light at an angle to the original input direction, the light engine and associated components can be disposed substantially parallel to a ceiling tile or similar structural member. This orientation of the light guide, combined with the thinness of the light engine, significantly reduce the necessary overhead space as compared to traditional parabolic wall wash systems, and the thinness allows the lighting system to be made flush with the surrounding ceiling tiles even in implementations where the overhead space above the ceiling tiles is shallow. In some implementations, an output surface of a light guide can be oriented at roughly a 90° angle to the surface to be illuminated. FIG. 1A shows a perspective view of an example of a light engine configured to emit collimated light at an oblique angle. The light engine 100 includes a light source 102 disposed adjacent an input aperture 112 of a reflector 110. The reflector 110 has a substantially constant cross-section over the height of the reflector, and includes reflective sidewalls 114 having a shape designed to preserve etendue, and reflective a top planar reflector 116a and a bottom planar reflector 116b along the top and bottom of the reflector 110. While illustrated as having exterior surfaces which correspond to the shape of the interior reflective surfaces, the reflector 110 may have any exterior shape, so long as the interior reflective surfaces have a desired shape.

In particular implementations, the reflective sidewalls may have a shape which can be represented by a portion of a parabola, although the facing reflective sidewalls 114 may in such implementations not form sections of a single parabola. Rather, the sidewalls 114 may include sections of a single parabola which have been rotated with respect to one another, so that extension of these parabolic sections will intersect at an angle rather than a smooth vertex.

When the sidewall shapes satisfy specific boundary conditions related to the size of the input aperture 112, the sidewalls may collimate light, transforming a wide range of angles of light input through input aperture 112 to a narrower range of angles. When the necessary boundary conditions are satisfied, there will be no etendue loss due to the shape of sidewalls 112, increasing the efficiency of the light collimation, although material and manufacturing limitations may introduce some etendue loss.

In particular, cross-sections orthogonal to a longitudinal axis extending between the input aperture 112 of the reflector 110 and an output aperture 118 at the opposite end of the reflector 120 will have a rectangular shape that increases in lateral width moving along the longitudinal axis from the input aperture 112 to the output aperture 118. Similarly, cross-sections orthogonal to a transverse axis extending between the planar surfaces 116a and 116b (see FIG. 1B) at the top and bottom of the reflector 110 will have a parabolic-like cross-section with a truncated edge near the vertex of the parabolic-like shape, corresponding to the input aperture 112 of the reflector 110.

The output aperture 118 of the reflector 110 is positioned adjacent an input surface 122 of a tapered light guide 120. To facilitate light transfer from the reflector 110 to the light guide 120, the output aperture 118 has dimensions which correspond to the dimensions of the input surface 122. The tapered light guide 120 includes triangular sidewalls 124, a planar upper surface 126, and a planar output surface 128 underlying and oriented at an angle to the upper surface 126.

Cross-sections of the tapered light guide 120 orthogonal to a longitudinal axis extending between the input surface 122 and the opposite end of the tapered light guide 120 will have a rectangular shape that decreases in transverse height along the longitudinal axis away from the input surface 112 to the opposite edge of the tapered light guide 118. Similarly, cross-sections orthogonal to a lateral axis extending between the triangular sidewalls 124 will have a triangular cross-section which remains substantially constant across the lateral width of the tapered light guide 120.

Figure 1B:
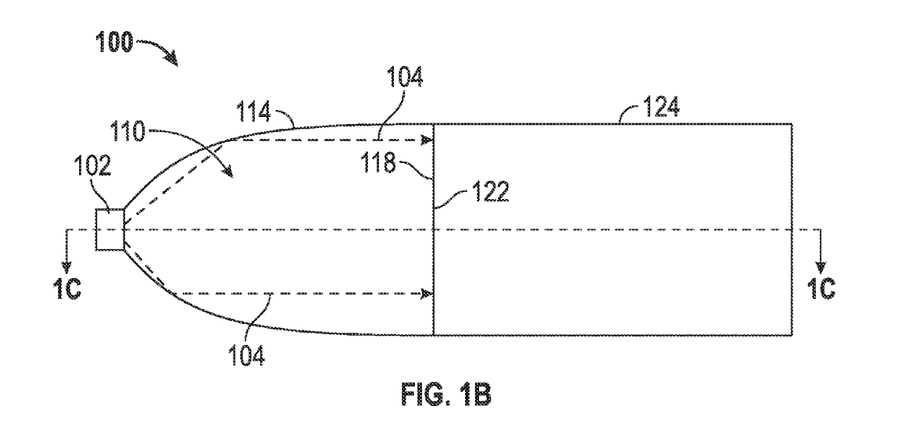
FIG. 1B is a top plan view of the light engine of FIG. 1A.

FIG. 1B is a top plan view of the light engine of FIG. 1A. It can be seen that light 104 emitted from the light source 102 at a variety of angles is redirected by the curved reflective sidewalls, and generally reflected towards the output aperture 118 of the reflector 110. The curved sidewalls 114 thus generally collimate the light 104 in a meridian parallel to the top and bottom planar surfaces 116a and 116b, as discussed above. The amount of collimation of the light within this meridian is controlled at least by the exact shape of the curved reflective sidewalls 114 and the longitudinal length of the reflector 110, as well as other factors such as the number and size of the light emitting elements in the light source 102.

Figure 1C:
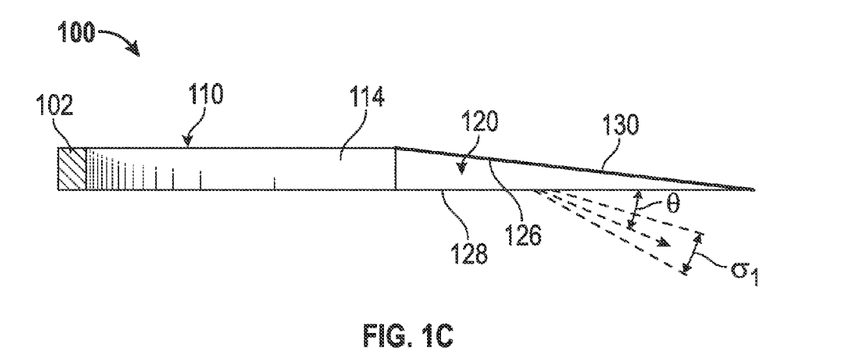
FIG. 1C is a cross-sectional side elevation view of the light engine of FIG. 1A taken along the line 1C-1C of FIG. 1B.

FIG. 1C is a cross-sectional side elevation view of the light engine of FIG. 1A taken along the line 1C-1C of FIG. 1B. Light 104 (see FIG. 1B) exiting the reflector 110 and entering the light guide 120 though the input surface 122 propagates within the light guide 120 before exiting the light guide 120 through the output surface 128. Light-shaping optics (not shown) such as a stack of optical films disposed adjacent the output surface 128 may further control the output light 104 ejected from the output surface 128. The light output 104 is centered around a central light ray 107 which is oriented at an oblique angle θ which in the illustrated implementation is shallow relative to the output surface 128 of light guide 120. Propagation of the light 104 within the light guide 120 may be controlled either by total internal reflection or by covering some or all of the non-output surfaces (the upper planar surface 126 and the sidewalls 114 with a reflective layer 130. However, the design of the light guide 120 generally collimates the light in a second meridian orthogonal to the meridian in which the light was previously collimated within the reflector 110. FIG. 1C schematically illustrates the output light 104 as being generally collimated in a first meridian (within the page), but the output light 104 will also be collimated within a second meridian (orthogonal to the page). The degree of collimation in the orthogonal meridians is not necessarily equal for both planes. For example, light may be collimated such that it is generally emitted within a first angle $\sigma_1$ in a meridian parallel to the plane of the page, and within a second angle $\sigma_2$ (see FIG. 1D) in a meridian orthogonal to the meridian of angle $\sigma_1$. For example, the first angle $\sigma_1$ and the second angle $\sigma_2$ can represent the full width at half maximum of the beam. The design of the reflector 110 and the tapered light guide 120 allow control over not only the oblique angle θ at which the light is ejected from the light guide, but also the amount of spreading in both meridians once the light is ejected.

In addition, thermal management of the heat generated from light source 102 may be accomplished by at least one of convective or conductive heat transfer. In one implementation, the light source 102 may be in thermal communication with a plurality of thermal fins (not shown in FIGS. 1A-1D, see FIG. 4) which allow passive dissipation of heat via convection. In other implementations, active cooling may be provided, such as through the use of a fan or similar component.

Other implementations of light engines such as light engine 100 can include other or alternate components. For example, the reflector 100 may include two or more components assembled together to provide an interior reflective chamber of the desired shape, but which include additional material disposed outside of the chamber to allow for securement of the light engine 100 to other components of a light fixture or to other structural components.

Figure 1D:
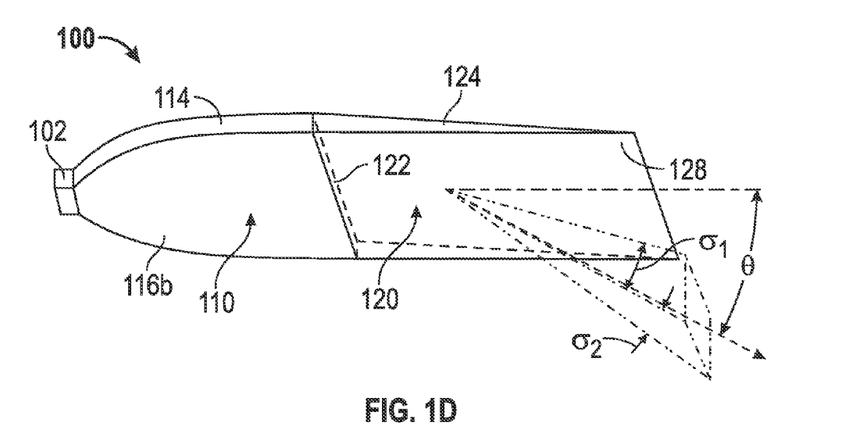
FIG. 1D is a perspective view of the light engine of FIG. 1A from below, illustrating an exemplary light output ejected from the output surface of the light engine.

FIG. 1D is a perspective view of the light engine of FIG. 1A from below, illustrating an exemplary light output ejected from the output surface of the light engine. The light output 104 is centered around a ray 107 which is oriented at an oblique angle θ to the output surface 128 of the light guide 120. The light output is generally collimated in both meridians, but spreads out over an angle of $\sigma_1$ within a first meridian, and over an angle of $\sigma_2$ within a second meridian orthogonal to the first meridian, so as to cast a far-field light pattern generally within a plane 108 at a distance from the output surface 128 of the light guide 120.

Figure 2:
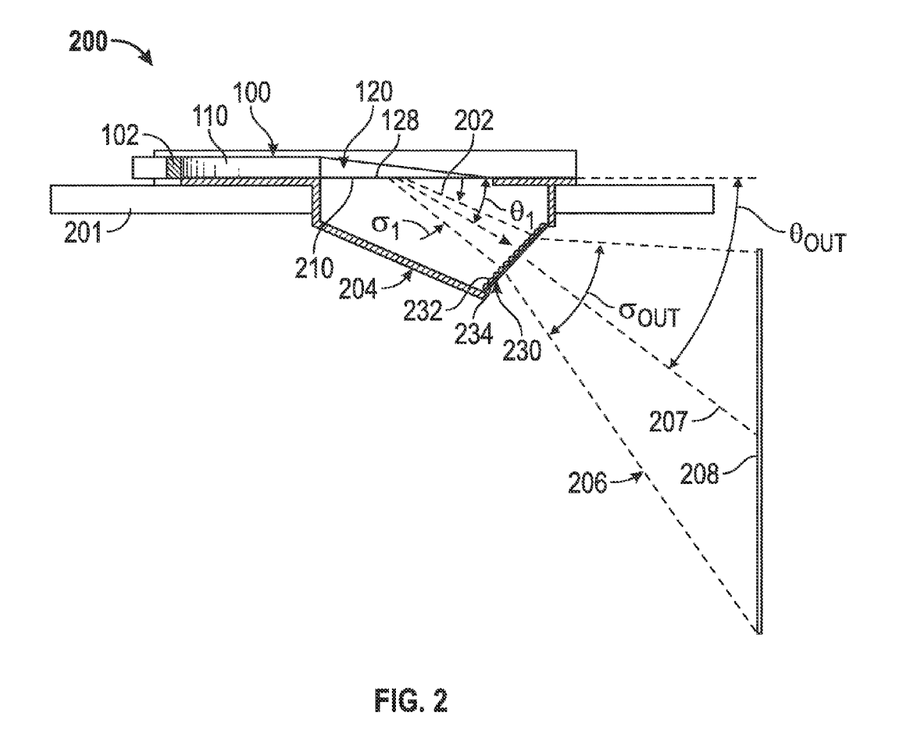
FIG. 2 shows an example of a cross-section of a light wash system that can be used with the light engine of FIGS. 1A-1D.

FIG. 2 shows an example of a cross-section of a light wash system that can be used with the light engine of FIGS. 1A-1D. In some implementations, the light wash systems described herein may serve as wall wash systems configured to illuminate a portion of a wall, but in other implementations they may serve to illuminate a portion of a ceiling or floor, or a surface or region oriented at any angle to the output surface. For convenience, such lighting systems may be referred to herein as a "light wash system," and implementations in which the surface to be illuminated is oriented at an angle (for example, where the surface to be illuminated is non-parallel with the output surface of the light engine) to an output surface of a light guide can be referred to as an "oblique wash system," or an "oblique light wash system."

The light wash system 200 includes a housing 204 which is configured to extend at least partially through an aperture in a ceiling 201, and includes an input aperture 210 and an output aperture 220. The input aperture 210 is dimensioned to receive light 202 ejected from a light engine 100 disposed over the input aperture 210 such that the output surface 128 of a tapered light guide 120 of the light engine 100 is located adjacent the input aperture 210. The output aperture 220 is located at a position relative to the input aperture 210 such that all or a substantial portion of the light input through the input aperture 210 at the oblique angle at which it exits the light guide 120 will pass through the output aperture 220 of the housing 202.

Disposed within or aligned with the output aperture 220 a stack of optical films 230 which operate on the light 202 passing through the output aperture 220 to generate a light output 206 centered about a ray 207 which casts a desired light pattern in a plane 208 located at a given distance from and angle relative to the light shaping optics 230. The stack of optical films 230 thus provides means for altering light 202 passing through the output aperture 220 of housing 204 to cast a desired light pattern in a plane 208 at a given distance from the output aperture 220, as discussed in greater detail herein. The stack of optical films 230 may alter the light 202 by shaping and/or redirecting the light 202. In an implementation in which the light wash system is configured to cast light on a wall adjacent a ceiling 202, the plane 208 may be orthogonal to the output surface 128 of the light guide 120, although in other implementations, the plane 208 in which the desired light pattern is cast may be oriented parallel to or at any other angle to the output surface 128 of the light guide 120.

In the illustrated implementation, the stack of optical films 230 is illustrated as including a lenticular film 232 and a diffuser 234, both with base planes roughly orthogonal to the optical axis of the input light however, in various implementations, the stack of optical films can include a single or multiple optical films such as light spreading and/or light directing optics, a single or stack of lenticular films, a single or stack of films including an array of lenses or lenslets, a diffuser, a light-turning film, or any combination of one or more of the above. In applications where the angular extent of the native beam coming from the light guide 120 is sufficient, the stack of optical films 230 may include only one or more turning films to direct the light to a particular location on an architectural surface without affecting the angular spread of the beam.

The stack of optical films may be configured to spread light further in at least one meridian, and may comprise a series of curved surfaces on one side of a substrate. In particular implementations, these curved surfaces may have a substantially constant cross-section in a lateral direction, or any other appropriate direction, depending on the orientation of the lenticular film. Light passing through these surfaces will be spread in a meridian orthogonal to the direction of constant cross-section of the curved surfaces. In other implementations, however, a wide range of lens structures may be used. For example, the lenses may have a triangular, prismatic, semi-cylincrical-, sinusoidal-, parabolic-, and/or hyperbolic-like cross section. These lens structures may modify a light beam in one or more meridians, and a spreading effect of these lens structures may increase with increased curvature of these lens structures. The lens structures may be elongated in at least one direction. Each of the lenses on a given optical film within a stack of optical films may share the same optical shape, or may have different optical shapes and/or sizes from other lenses on that film, and other films within the stack. The lenticular-like films may in various implementations be with or without optical power.

In some implementations, the desired light pattern is a light wash which is substantially constant within a plane 208 at a right angle to the output surface 128, such as a light wash on a wall adjacent a ceiling in which the light wash system is installed. In such an implementation, the path between the output surface 128 and a point within the plane 208 near the bottom of the light wash will be longer than the path between the output surface 128 and a point within the plane 208 near the top of the light wash. Because the spreading of the light will result in a reduction in intensity which is dependent on the distance from the light source, output light 206 which has an intensity symmetric about central ray 207 will cast a light wash on the wall which is brighter near the top of the light wash than near the bottom.

An asymmetrical light output 206 configured to generate a symmetrical light wash within a plane 208 oriented at a non-right angle to the central ray 207 of the light output 206 can be achieved in one implementation through the use of an asymmetrical lenticular film in which the lenticular curved structures are asymmetrical in a plane oriented at an angle to the plane of the film. When such a structure spreads light passing therethrough, this light-spreading may be asymmetrical in the plane of asymmetry of the curved structures, and such an asymmetrical lenticular film may be used to increase the intensity of the light output 206 below the central ray 207 as compared to the intensity of the light output 206 above the central ray 207, thereby providing a substantially constant intensity across the light wash cast in plane 208.

In other implementations, the stack of optical films 230 can include alternative or additional structures in addition to a lenticular film 232 and a diffuser 234. For example, in some implementations, the stack of optical films 230 can include a second lenticular film (not shown in FIG. 2) in which the lenticular elements are oriented orthogonal to or at another angle to the lenticular elements in the lenticular film 232. The use of multiple lenticular films can allow light-spreading in a second meridian, such as a meridian orthogonal to the first meridian in which lenticular film 232 spreads light. In the absence of a second lenticular film or other structure, the light pattern will not be spread in a meridian perpendicular to the page, and the light pattern may be substantially the same width as the light guide, depending upon the pre-collimation of the light prior to injection into light guide 120. To spread light in both in-page and perpendicular-to-page meridians with a single optical film, a film including an array of lenslets or other structures that are curved in two dimensions may be used. Use of lenslet arrays can cast a light pattern on the wall on the wall which can be circular or elliptical, depending on the shape and symmetry of the lenslets. Alternatively, a stack including two lenticular films with elongated lenticules orientated at right angles relative to each other can also achieve light spreading in two orthogonal meridians. Also, it is noted that while the lenticular film 232 in FIG. 2 is shown with curved surfaces oriented towards the light guide 120, in other implementations, it is understood that the lenticular film 232 may also be oriented so that the flat surfaces faces the light guide 120. In implementations with a stack of lenticular films 232, various films in the stack may have curved or flat surfaces oriented toward the light guide depending upon the desired spreading effect.

In the implementation of FIG. 2, the light 202 ejected from the light engine 100, passes through the input aperture 210 of the housing 200 and directly through the output aperture 220 and stack of optical films 230 without necessarily interacting with any other portion of the housing. Such a configuration of a light wash system, however, may be constrained in terms of the setback distance between the system and the wall, as the light 202 reaches the stack of optical films 230 at an angle θ to the output surface 128 of the light guide 120, which may limit the angle $θ_{OUT}$ of the light output 206 relative to a plane of the input aperture 210 for certain light wash patterns. This limitation on minimum setback distance may require that such a light wash system be set farther back from the wall than may be desired. In some implementations of the light wash system 200 and the other light wash systems discussed herein the angle $\theta_{OUT}$ of a central axis of the light output 206, schematically illustrated herein as central ray 207, may be roughly 65° or less, although in other implementations larger angles $\theta_{OUT}$ may be used, particularly if the desired light pattern is not a substantially even wash.

As can be seen in FIG. 2, the stack of optical films 230 can act on light passing therethrough to both the angle $\theta_{OUT}$ of the light output 206 relative to angle $\theta$ of the light 202 and the resultant spread $\sigma_{OUT}$ of the light output 206 in a meridian parallel to the page compared to the spread $\sigma_1$ of the light 202. Thus, the stack of optical films 230 can operate both to redirect the light as a whole by altering the $\theta_{OUT}$ of the light output 206, and to spread the light output in at least one meridian as shown by the increase in $\sigma_{OUT}$ of the light output 206 relative to the spread $\sigma$ of the light 202. Additional spreading in a meridian extending out of the page may also occur, as discussed above, in order to provide a light pattern which is spread in both meridians.

Figure 3:
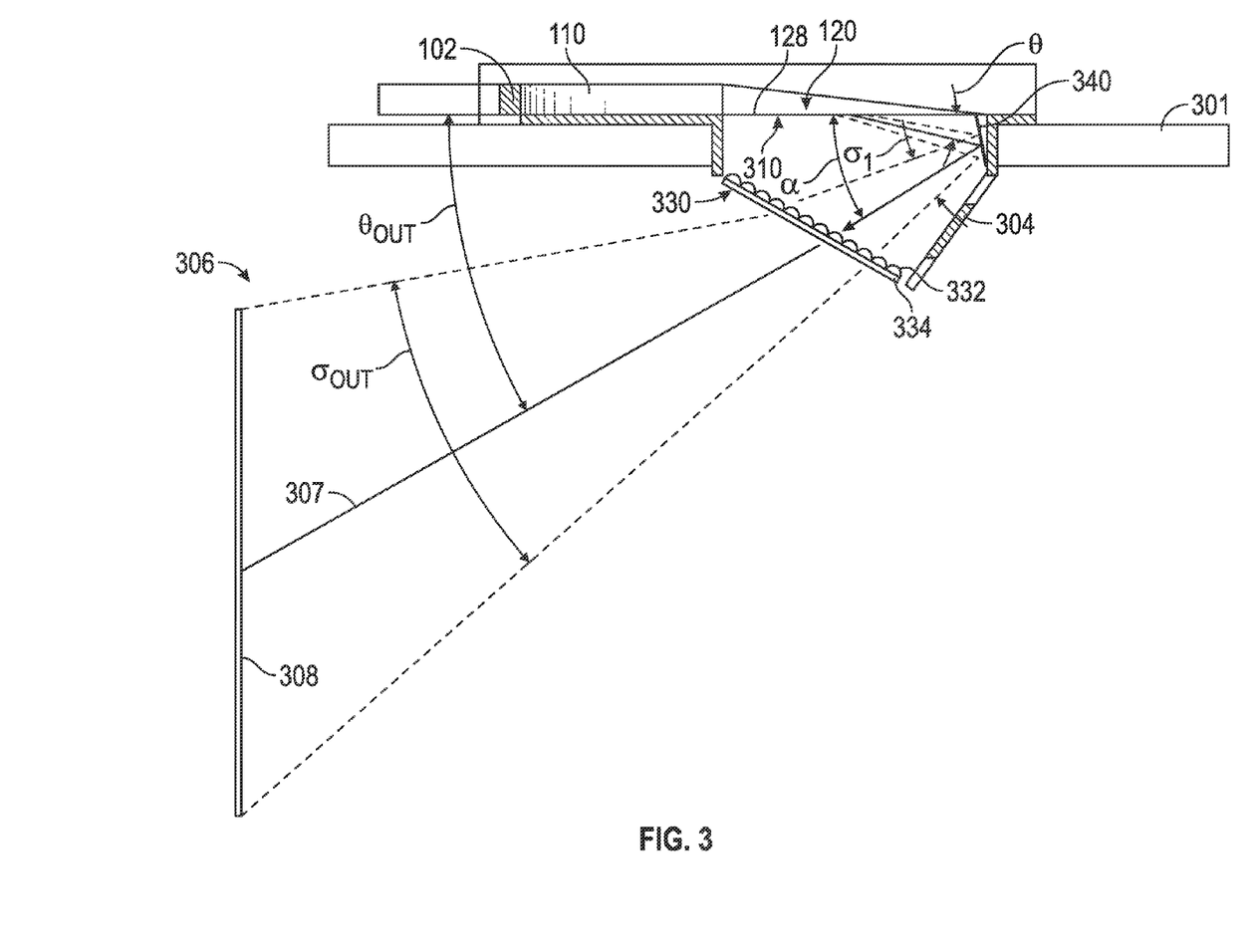
FIG. 3 shows an example of a light wash system which includes a retroreflector to enable shorter setback distances than the light wash system of FIG. 2.

FIG. 3 shows an example of a light wash system which includes a retroreflector to enable shorter setback distances than the light wash system of FIG. 2. The light wash system 300 includes a housing 304, where at least a portion of the housing 304 is configured to extend through an aperture in a ceiling 301 or other supporting member. The housing 304 includes an input aperture 310 and an output aperture 320, as well as light-shaping optics such as a stack of optical films disposed within or adjacent output aperture 320. In contrast to the light wash system 200 of FIG. 2, however, the light wash system 300 also includes a retroreflector 340 disposed within the housing and configured to redirect light 302 emitted from the output surface 128 of light guide 120 towards the output aperture 320 and the stack of optical films 330. As discussed above with respect to FIG. 2, this stack of optical films 330 can modify not only the output angle $\theta_{OUT}$ of the light output 306 relative to the input angle, but also the spreading $\sigma_{OUT}$ in a meridian parallel to the page relative to the spreading $\sigma_1$ of the input light in this meridian, as well as the spreading or angle shifting (both not shown) in a meridian orthogonal to the page.

By redirecting light 302 using retroreflector 340, the light 302 can be directed towards output aperture 320 and the stack of optical films 330 at an angle $\alpha$ relative to the plane of the output surface 128 of light guide 120. The initial output angle $\theta$ of the light 302 is a function of the geometry of the light engine. While the stack of optical films 330 can increase to some degree the output angle $\theta_{OUT}$ of the light output 306, this increase may in some implementations be insufficient to cast a desired light pattern on a wall or other surface at a given setback distance. That is, the light output 306 may hitting too high on the wall for a given setback distance.

When the retroreflector 340 is oriented at an obtuse angle relative to the output surface 128 of light guide 120 as illustrated in FIG. 3, the angle $\alpha$ can be greater than the angle $\theta$ at which the light 302 is ejected from the output surface 128 of light guide 120. This increased angle $\alpha$ can facilitate, among other things, the use of a setback distance of the light wash system 300 to a plane 308 such as an adjacent wall which is less than a minimum setback distance of the light wash system 200 of FIG. 2 to cast the same light pattern on the wall. This shorter throw distance can relaxes other constraints on the design of a lighting system and minimizes interference from objects located or passing between the light wash system 300 and the plane 308 to be illuminated.

Figure 4:
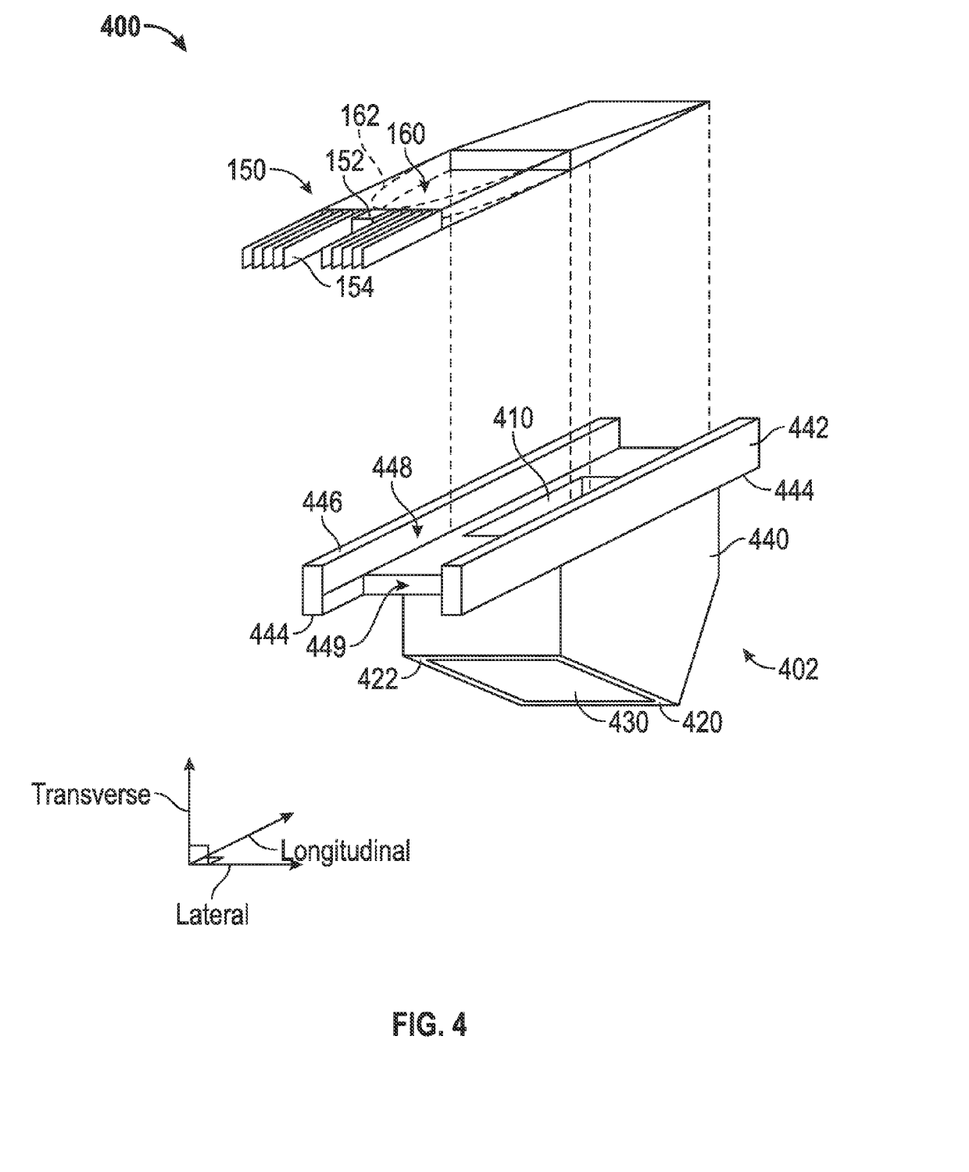
FIG. 4 shows an example of an exploded perspective view of a light wash system including a light engine similar to that of FIGS. 1A-1D.

FIG. 4 shows an example of an exploded perspective view of a light wash system including a light engine similar to that of FIGS. 1A-1D. The light wash system 400 includes a housing portion 402 and a light engine 150, which is similar in many respects to the light engine 100 of FIGS. 1A-1D.

The housing 402 of the light wash system 400 includes an input aperture 410 and an output aperture 420 in which the stack of optical films 430 can be disposed. The housing 402 also includes a section 440 of substantially constant cross-section in a transverse direction. This section 440 can be dimensioned so as to be inserted through an aperture in a ceiling or other support member. This section 440 may also have a height which is roughly equal to the thickness of the ceiling tile and any other intermediate components of the light structure, such that the uppermost portion of tapered output face 422 through which output aperture 420 extends is located close to the lower surface of the ceiling, thereby minimizing the size of the portion of housing 402 which extends below the lower surface of the ceiling.

An upper portion 442 of the housing 402 includes a longitudinally extending portion which is longer than the section 440 configured to extend through an aperture. This additional length, and in particular the overhanging portions 444 at each end, can rest on top of the portions of the ceiling adjacent the aperture in the ceiling to support the light wash system 400. Sidewalls 446 extending transversely upward from the upper portion 442 define a receiving area 448 for the light engine 150, which can be disposed within the receiving area and further secured in place by screws, bolts, adhesives, or other appropriate fastening means if desired.

By extending the housing 402 in only a longitudinal length, rather than a lateral width, installation of the light wash system 400 within an aperture in a ceiling or other structural member (see FIG. 3) can be facilitated. In particular, the housing 402 can be tilted upwards and slid through the aperture such that all of upper portion 442, including both overhanging portions 444, is inserted through the aperture in the ceiling. The housing 402 can then be moved backwards pulled backwards in the area above the ceiling such that both overhanging portions 444 contact the ceiling on opposite sides of an aperture in the ceiling. Because the housing 402 does not extend laterally beyond the edges of an aperture in the ceiling, this sliding method of installation can be utilized to install the light wash system 400 in an aperture of minimal size, without requiring substantial overhead space above the ceiling.

It can also be seen in FIG. 4 that the illustrated light engine 150 differs slightly from the light engine 100 of FIGS. 1A-1D. For example, the reflector structure 160 has a substantially rectangular shape, although an interior section of the reflector structure 160 including curved sidewalls 162 is substantially similar in shape to the reflector 110 of light engine 100. The additional material 164 of reflector structure 160 located longitudinally distal and laterally outward of the interior reflective chamber can be used, for example, to conduct heat away from the light source 152 and as a location for securing the light engine 150 to an adjacent component of the light wash system 400.

The light engine 150 of FIG. 4 also depicts thermal management components in the form of thermal fins 154 which can be used to conduct heat away from light source 152. In particular, thermal fins 154 can utilize conductive and convective cooling to passively dissipate heat away from the light source 152 which can generate a substantial amount of heat, particularly in implementations in which one or more LEDs are utilized as light sources 152. In the illustrated implementation, the upper portion 442 of the housing 402 includes a cutout portion 449 which will underlie the array of thermal fins 154 to further facilitate airflow across the thermal fins 154 and the corresponding convective heat transfer. Furthermore, the housing 402 may include a second cutout portion (not illustrated) away from the LEDs and thermal fins 154 to allow for a cold air return vent. For example, the second cutout portion may be on the opposite end of the housing 402 from the first cutout 449. In this way, as the thermal fins 154 heat air and the hot air rises above the housing, the air may move across the light engine 150 from above, cool, and then return to the ambient environment below the housing through the second cutout portion. In this way, a current of air may form to better cool the thermal fins 154.

In further implementations, a light wash system can include multiple light engines, some of which may be configured to direct output light in different directions. In further implementations or other implementations, the light wash system can include multiple components configured to be secured to one another to form the light wash system.

Figure 5:
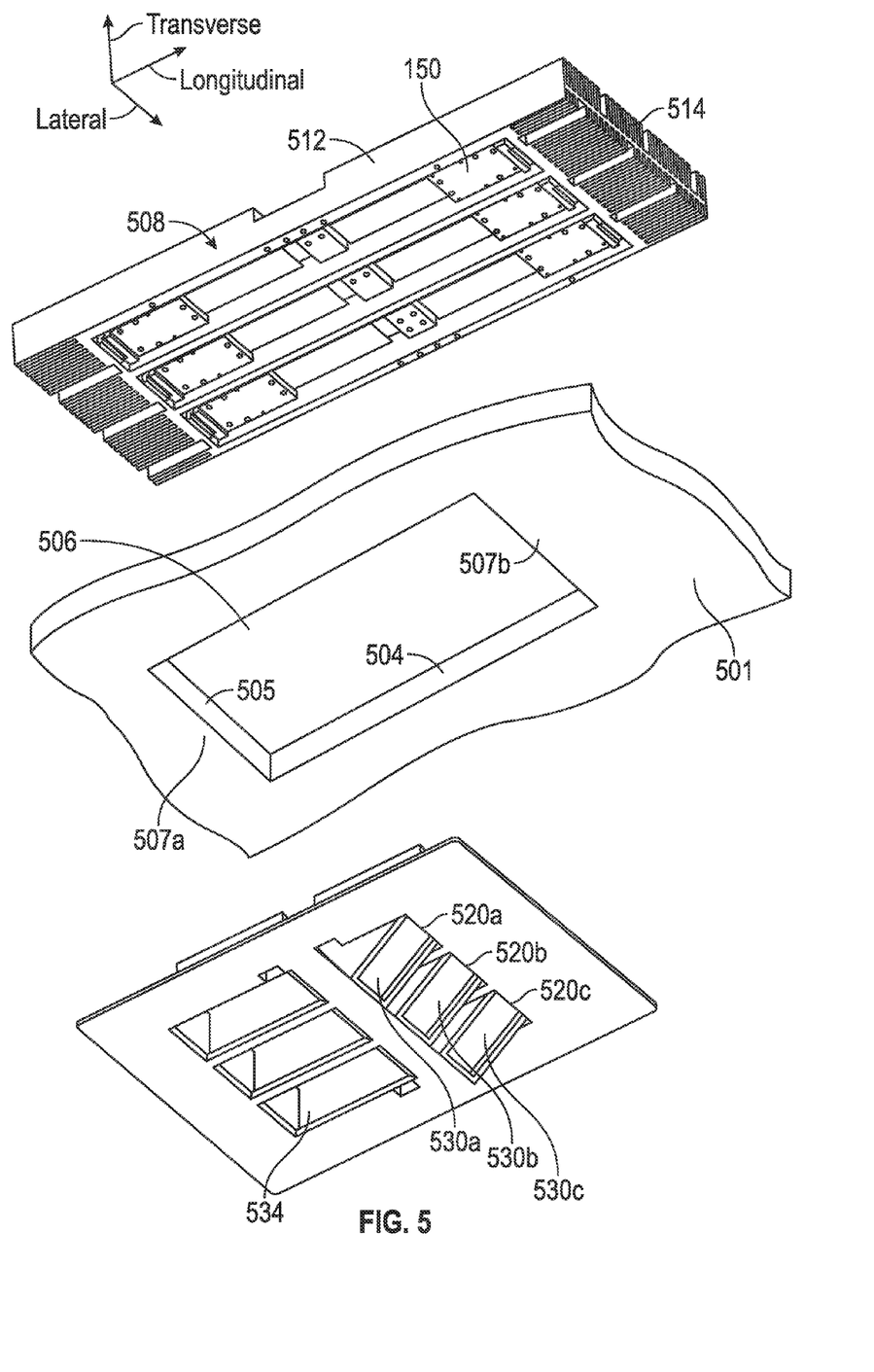
FIG. 5 shows an example of an exploded perspective view of a light wash system including multiple light engines configured to output light in different directions.

FIG. 5 shows an example of an exploded perspective view of a light wash system including multiple light engines configured to output light in different directions. The light wash system 500 includes an upper frame 508 supporting a plurality of light engines 150, and a lower housing portion 502 which includes a plurality of input apertures (not shown) and obliquely-oriented output apertures 520a, 520b, and 520c with corresponding stack of optical films 530a, 530b, and 530c disposed therein. Retroreflectors (not shown) may also be disposed within the lower housing portion to increase the angle of or otherwise alter the light passing through any of the stacks of optical films 530a, 530b, and 530c.

The lower housing portion 502 also includes a plurality of substantially vertically extending apertures 534 extending therethrough, which allow for thin light engines to direct light output substantially downward through the vertically extending apertures 524, such that a plurality of light outputs extending in different directions can be provided by the light wash system 500. In particular, the light engines 150 overlying the substantially vertically extending apertures 534 may be configured to eject light in a direction substantially normal to the output surface of the light guides, in contrast to the obliquely-oriented light output of the other light engines 150 and other light engines discussed herein. Alternately, stacks of optical films may be disposed within the vertically extending apertures 534 to alter the light output through the vertically extending apertures 534. Thus, a single light fixture can provide both downwardly-directed lighting and an obliquely oriented light wash.

The upper frame 508 may be longer in one dimension than an aperture 506 in a ceiling 501 or other structure in which it is to be installed, but roughly the same dimension or smaller in the perpendicular direction. For example, in the illustrated implementation, the longitudinal side 512 of upper frame 508 may be longer in a longitudinal direction parallel to the long dimension of the light engines 150 relative to the longitudinal edge 504 of aperture 502. However, lateral side 514 of the upper frame 408 may have a width which is similar to the lateral edge 505 of the aperture 506 in which it is to be installed. Installation can proceed as described with respect to the housing of FIG. 4, with the upper frame 508 being slid into the aperture in a longitudinal direction, and then subsequently by the ceiling portions 507a and 507b at located longitudinally outward of the lateral edges 505 at opposite sides of the aperture 506.

A frame 508 which has been installed in this manner can serve as an anchor structure or anchor component for additional components, even if the frame 508 is not fixedly coupled or otherwise secured to the ceiling 501, as the weight and longitudinal length of the frame 508 will hold the frame 508 in place. More secure retention can be provided via direct securement to the ceiling 501, such as through the use of fasteners or adhesives. Alternately, a lower component such as lower housing portion 502 can be secured to the frame 508 such that a portion of the frame 508 is disposed on the opposite side of the ceiling 501 from a portion of the lower housing portion 502 to frictionally retain the assembled light wash system in place relative to the ceiling. In such an implementation, the frame 508 and the lower housing portion 502 can retain therebetween the portions 507a and 507b of the ceiling 501 adjacent the aperture 506.

In particular, the lower housing portion 502 includes an outwardly extending bezel 503 which is dimensioned to extend parallel to a portion of a ceiling 501 or other structural member to which the light wash system 500 is secured. When the lower housing portion 502 is secured to the frame 508, portions 507a and 507b of the of the ceiling 501 on the longitudinal ends of the aperture 506 will be disposed between the bezel 503 and the longitudinal edges of the frame 508. In addition, because the lower housing portion 502 does not need to pass through the aperture 506 in the ceiling 501 or other support member, the bezel 503 can be larger than the aperture 506 in all dimensions so as to fully conceal the aperture 506.

In other implementations, rather than being installed within an aperture in a ceiling tile or other structural component, the light wash system 500 may itself take the place of a ceiling tile in, for example, a false ceiling including an array of ceiling tiles. In such an implementation, the bezel 503 may be dimensioned such that the light wash system 500 may take the place of a ceiling tile. In such an implementation, the assembled light wash system 500 may itself be rest within a frame of the false ceiling, or the frame 508 and the lower housing portion 502 brought together to secure a portion of the ceiling frame therebetween. In such an implementation, the frame 508 may be integrated with the lower housing portion 502 to form a single integral structure which can be used to replace a ceiling tile or similar structural component.

In other implementations, housing portions with light-shaping optics such as a stack of optical films may not be integrated with a lower housing portion 502 as illustrated, but may instead be discrete components which may be secured or otherwise retained relative to the other components of the light wash system 500, or may be integrated with the upper frame 508.

In addition to differences between the stacks of optical films disposed within the vertically extending apertures 534 and the obliquely-oriented apertures 520a, 520b, and 520c and the corresponding light patterns generated by these stacks, the stacks of optical films 530a, 530b, and 530c disposed within the various obliquely-oriented apertures 520a, 520b, and 520c may differ, and the stacks of optical films, if any, disposed within the various vertically extending apertures 534 may similarly differ. The stacks of optical films the stacks of optical films 530a, 530b, and 530c may cooperate with one another to cast a desired light pattern. For example, in one implementation, the stack of optical films 530a within obliquely-oriented aperture 520a and the stack of optical films 530c within obliquely-oriented aperture 520c may be configured to direct light along central axes angled inward (towards central obliquely-oriented aperture 520b) to collectively cast a light pattern over a smaller area, or angled outward (away from obliquely-oriented aperture 520b) to collectively cast a light pattern over a wider area. In other implementations, the stacks of optical films 530a, 530b, and 530c can be selected independently to cast any other desired light pattern, including but not limited to shaped spotlights such as circular or rectangular spotlights, gradients, or other light patterns. In other implementations, one or more of the obliquely-oriented apertures 520a, 520b, and 520c may not include a stack of optical films disposed therein.

Figure 6:
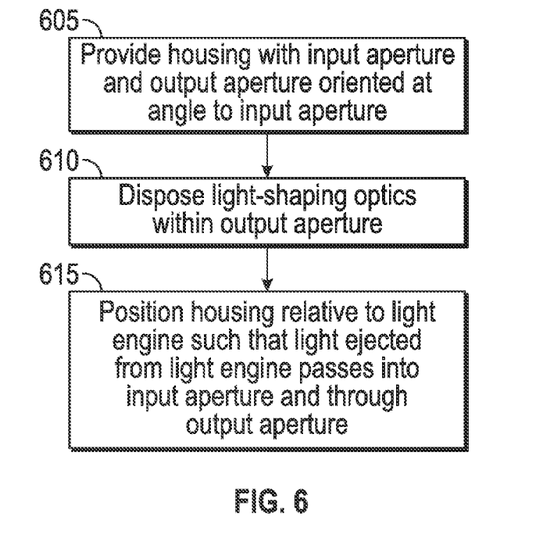
FIG. 6 is a block diagram showing an example of a method for assembling a light fixture.

FIG. 6 is a block diagram showing an example of a method for assembling a light fixture. The method 600 begins at a block 605, where a housing is provided, the housing having an input aperture and an output aperture oriented at an angle to the input aperture. In some implementations, as discussed above, the input aperture is aligned with the output aperture such that light ejected through the input aperture is directed directly towards the output aperture. In other implementations, a retroreflector may be disposed within the housing, such that light input through the input aperture of the housing can be redirected towards the output aperture of the housing.

The method 600 moves to a block 610, where a stack of optical films are provided within the output aperture, such that light passing through the output aperture passes through and is operated on by the stack of optical films. In some implementations, the stack of optical films may include at least one lenticular film configured to spread light in one meridian. The lenticular film may be asymmetrical in order to increase the intensity of the output light on one side of a central ray relative to the other side to cast a desired light wash in a plane that is not orthogonal to the central ray of the output light. In some implementations, at least a second lenticular film may be used to spread light in an orthogonal meridian, and other light-shaping or light-directing optics such as diffusers or light turning films can be used as well.

The method 600 moves to a block 615 where the housing is positioned adjacent a light guide configured to eject light at an oblique angle, such that the light ejected from the light guide enters the housing through the input aperture and exits the housing through the output aperture, passing through the stack of optical films. The stack of optical films operates on light exiting the housing through the output aperture to cast a desired far-field light pattern in a plane at a given distance from the output aperture. In some implementations, this light pattern can be a substantially even wash of light, although a wide variety of other patterns can be cast through selection of the housing components and orientation of the apertures, and the selection and positioning of the stack of optical films.

Figure 7A:
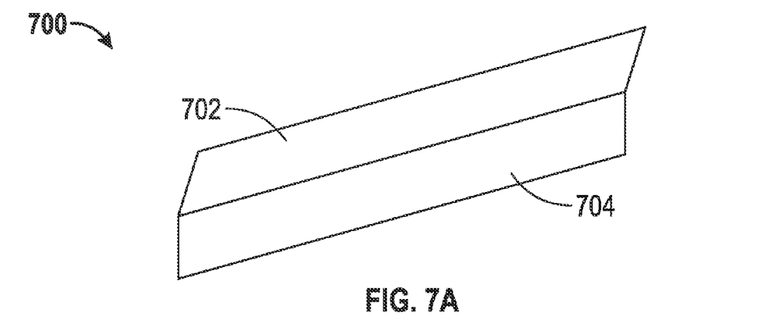
FIGS. 7A and 7B illustrate alternate implementations of a retroreflector for use with a light wash system such as the light wash system of FIG. 3.
Figure 7B:
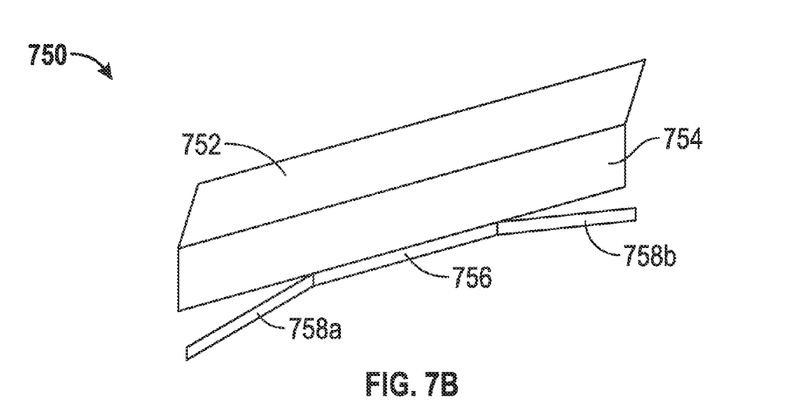

In some implementations, further light-shaping can be provided by the use of a retroreflector having a desired shape. FIGS. 7A and 7B illustrate alternate implementations of a retroreflector for use with a light wash system such as the light wash system of FIG. 3. The retroreflector 700 includes a first reflective portion 702 oriented at an angle to a second reflective portion 704. In the illustrated implementation, the first and second reflective portions 702 and 704 are generally planar portions inwardly angled with respect to one another, and may be formed, for example, by bending or crimping a sheet of reflective material.

Retroreflector 750 includes first and second reflective portions 752 and 754 which are similar to the first and second reflective portions 702 and 704 of retroreflector 700. The retroreflector 750 also includes an additional reflective portion 756 and side portions 758a and 758b inwardly angled with respect to additional reflective portion 756 in a plane generally orthogonal to a plane in which first and second reflective portions 752 and 754 are inwardly angled with respect to one another. The additional reflective portion 756 may also be inwardly angled relative to both first and second reflective portions 752 and 754.

Because reflective portion of retroreflectors 700 and 750 are inwardly angled with respect to one another, light reflected from the retroreflectors 700 and 750 may be more tightly localized in the near field (for example, near the output aperture of the wall wash system). This near-field localization may, for example, facilitate the reflection of a larger amount of light through the output aperture of a housing and through the stack of optical films. Light incident near the base of the reflector will generally travel a greater distance from the output surface of the light guide. By inwardly angling portions 758a and 758b near the base of retroreflector 750, the retroreflector 750 can compensate for the increased spreading which will occur in this light incident near the base of the retroreflector, due to the longer path between the light guide and the retroreflector 750. Although illustrated as discontinuous, in some implementations, retroreflector 750 can be a continuous faceted or curved reflecting surface.

In addition, while the retroreflectors 700 and 750 are depicted as including a plurality of generally planar portions angled with respect to one another, other implementations of retroreflectors can comprise inwardly curving portions, in place of or in addition to the inwardly angled planar portions. In addition, other implementations of retroreflectors may include outwardly angled or curving portions in addition to or in place of inwardly angled or curving portions. Curved or angled retroreflectors such as retroreflectors 700 and 750 can be used in light wash systems such as the light wash system 300 of FIG. 3 or other light wash systems, including light wash systems not specifically discussed herein.

Various modifications to the implementations described in this disclosure may be readily apparent to those skilled in the art, and the generic principles defined herein may be applied to other implementations without departing from the spirit or scope of this disclosure. For example, a bezel can be applied to a stand-alone housing such as those depicted in FIGS. 2 and 3 for aesthetic purposes or to provide supplemental stability to the light sash system formed by the housing by securing a portion of the ceiling or other support member. As discussed above, such a bezel may be press-fit or secured via an appropriate fastener.

Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the light fixture or light engine as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations. Additionally, other implementations are within the scope of the following claims. In some cases, the actions recited in the claims can be performed in a different order and still achieve desirable results.

What is claimed is:

1. A light fixture component, comprising:
    a housing, the housing including:
        an input aperture configured to receive collimated light exiting at an oblique angle from a light guide; and
        an output aperture oriented at an angle to the input aperture and configured to allow light to exit the housing; and
    a stack of optical films disposed within the output aperture, wherein the stack of optical films are configured to operate on light exiting the housing through the output aperture to cast a desired light pattern in a plane at a given distance from the output aperture.

2. The light fixture component of claim 1, wherein the light pattern cast by the stack of optical films is centered along an axis that is angled 65 degrees or less from a plane of the input aperture.

3. The light fixture component of claim 1, wherein the stack of optical films are configured to cast a substantially even wash of light within a plane at a given distance from the output aperture, wherein the plane is substantially orthogonal to a plane of the input aperture.

4. The light fixture component of claim 1, wherein the stack of optical films includes at least a first lenticular film.

5. The light fixture component of claim 4, wherein the stack of optical films includes at least a second lenticular film including lenticular elements oriented at an angle with respect to lenticular elements of the first lenticular film.

6. The light fixture component of claim 4, wherein the stack of optical films includes at least one of a second lenticular film and a diffuser.

7. The light fixture component of claim 1, wherein the stack of optical films includes an asymmetrical lenticular film.

8. The light fixture component of claim 1, wherein the stack of optical films consists of a single optical film.

9. The light fixture component of claim 1, the housing additionally including a retroreflector disposed within the housing, wherein the retroreflector is configured to redirect light entering the input aperture towards the output aperture.

10. The light fixture component of claim 9, wherein the retroreflector is configured to reflect collimated light entering the input aperture at a first angle relative to a plane of the input aperture and reflect it at a second angle relative to the plane of the input aperture, wherein the second angle is larger than the first angle.

11. The light fixture component of claim 9, wherein the retroreflector is substantially more reflective than other interior surfaces of the housing.

12. The light fixture component of claim 9, wherein the retroreflector includes a first reflective portion which is inwardly angled relative to a second reflective portion.

13. The light fixture component of claim 12, wherein the first reflective portion is inwardly angled relative to a second reflective portion in a first plane, the light fixture component additionally including a third reflective portion which is inwardly angled relative to a second reflective portion in a second plane oriented at an angle to the first plane.

14. The light fixture component of claim 9, wherein the retroreflector includes an inwardly curving reflective portion.

15. The light fixture component of claim 1, wherein the housing is configured to transmit collimated light along substantially parallel paths within the housing.

16. The light fixture component of claim 1, the housing additionally including a bezel extending outwardly from the housing in a plane substantially parallel to a plane of the input aperture.

17. The light fixture component of claim 1, additionally including a light guide disposed adjacent the input aperture, wherein the light guide includes an output surface and is configured to direct collimated light through the input aperture at an oblique angle to the output surface of the light guide.

18. The light fixture component of claim 17, wherein the output surface of the light guide is oriented substantially parallel to a plane of the input aperture of the housing.

19. The light fixture component of claim 1, additionally including an anchor component, wherein anchor component is configured to be secured relative to an aperture formed in a ceiling or wall, and the housing is configured to be secured to the anchor component on the opposite side of the ceiling or wall from the anchor component.

20. The light fixture component of claim 19, wherein the anchor component supports at least one light guide in optical communication with a light source, and wherein the light guide is configured to collimate light emitted from the light source and direct the collimated light into input aperture at an oblique angle to the plane of the input aperture.

21. The light fixture component of claim 1, wherein the stack of optical films is configured to operate on generally collimated light exiting the housing.

22. A method of assembling a light fixture, the method comprising:
    providing a housing having an input aperture and an output aperture oriented at an angle to the input aperture;
    providing a stack of optical films disposed within the output aperture; and
    positioning the housing relative to a light guide configured to emit collimated light at an oblique angle to the input aperture, such that the light enters the housing through the input aperture and passes through the stack of optical films, wherein the stack of optical films are configured to operate on light exiting the housing through the output aperture to cast a desired light pattern in a plane at a given distance from the output aperture.

23. The method of claim 22, additionally including securing the housing relative to an anchor component disposed adjacent an aperture in a ceiling or wall so as to secure the housing and anchor component relative to the aperture, wherein at least a portion of the anchor component is disposed on the opposite side of the ceiling or wall from at least a portion of the housing.

24. The method of claim 22, wherein the light pattern cast by the stack of optical films is centered along an axis that is angled 65 degrees or less from the plane of the input aperture.

25. The method of claim 22, wherein the housing additionally includes a retroreflector disposed within the housing and in the path of the collimated light emitting from the light guide, and wherein the retroreflector is configured to redirect the collimated light entering through the input aperture towards the stack of optical films disposed within the output aperture.

26. A light fixture, comprising:
   a housing, the housing including:
      an input aperture configured to receive collimated light exiting at an oblique angle from a light guide; and
      an output aperture oriented at an angle to the input aperture and configured to allow light to exit the housing; and
   means for altering light passing through the output aperture to cast a desired light pattern in a plane at a given distance from the output aperture.

27. The light fixture of claim 26, wherein the light-shaping means include a stack of optical films disposed within the output aperture.

28. The light fixture of claim 26, wherein the light-shaping means are configured to shape and/or direct light passing through the output aperture.

29. The light fixture of claim 26, wherein the light-shaping means include at least one of a diffuser and a lenticular film.

* * * * *